No. 698,040. Patented Apr. 22, 1902.
O. MIETASCHK.
MEANS FOR AUTOMATICALLY COUPLING OR UNCOUPLING TRUCKS.
(Application filed June 5, 1901.)

(No Model.)

Witnesses:
Franz Meyer
Chemnitz H. Schining

Inventor:
Otto Mietaschk,
by Paul E. Schilling,
his attorney.

UNITED STATES PATENT OFFICE.

OTTO MIETASCHK, OF WIESENTHAL, GERMANY.

MEANS FOR AUTOMATICALLY COUPLING OR UNCOUPLING TRUCKS.

SPECIFICATION forming part of Letters Patent No. 698,040, dated April 22, 1902.

Application filed June 5, 1901. Serial No. 63,289. (No model.)

*To all whom it may concern:*

Be it known that I, OTTO MIETASCHK, a subject of the Emperor of Germany, residing at Wiesenthal, near Tzschecheln, Germany, have invented new and useful Improvements in Means for Automatically Coupling or Uncoupling Trucks, of which the following is a specification, reference being had to the accompanying drawings, in which—

Figure 1:
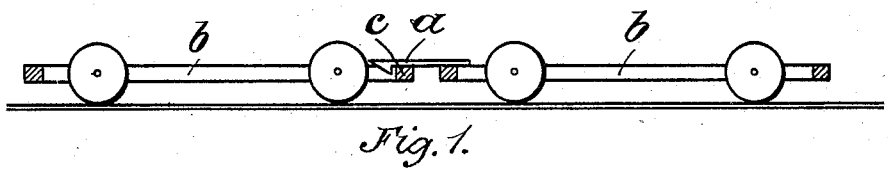
Figure 2:
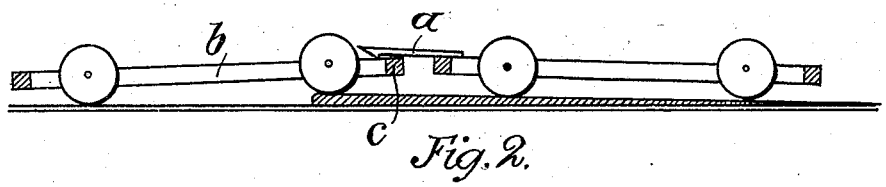
Figure 3:
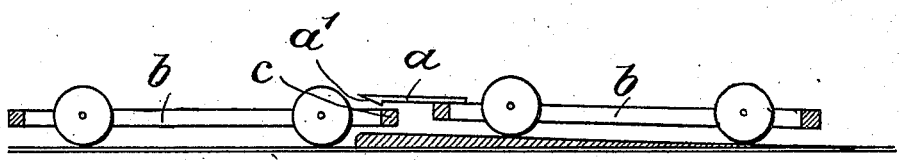

Figure 1 represents two trucks in coupled position. Fig. 2 represents the trucks in the position about to be uncoupled, and Fig. 3 shows the trucks in uncoupled position. The figures are executed partly in section, partly in elevation.

In various manufacturing processes trucks are used for transporting goods into, through, and out of a drying room or canal—for instance, in making pasteboard. These trucks, from which the boards to be dried depend, travel on tracks and are pushed, with their charge, into the drying-room, wherein they remain until the charge is dried to the desired extent. It is then necessary to draw out successively the trucks at the delivery end of the drying-room, freshly-charged trucks being pushed in at the front end of the drying-room. In present practice the trucks are coupled to one another and a person has to enter the drying-room in order to couple the freshly-charged truck to the preceding one in the drying-room and uncouple the respective front truck from the succeeding one in order to deliver it out of the drying-room. This, however, is an arduous and in some instances even impossible task, the heat in various processes being so excessive as to make it impossible for a person to breathe in it. In order to obviate this disadvantage, I have provided means whereby the coupling and uncoupling of the trucks is effected automatically within the drying-room.

In carrying out my invention I provide a gripper hook or catch $a$ at the front end of each truck $b$ and a corresponding catch part $c$ at the rear end of each truck. The hook is provided with a beveled lower edge $a'$. Upon one truck being pushed against the other the hook or catch $a$, by reason of the said beveled lower edge, slides over the corresponding catch part $c$ of the preceding truck, the front end of the truck rising until the hook catches behind the corresponding catch part of the other truck. The two trucks are now coupled. The uncoupling takes place in the following manner: Near the delivery end of the drying-room is provided an incline $d$, which the trucks have to pass before leaving the drying-room. Upon the one truck leaving this incline and the succeeding truck ascending it the hook $a$ comes free from the catch part $c$, as is clearly shown in Figs. 2 and 3, and the trucks are then uncoupled.

What I claim, and desire to secure by Letters Patent, is—

1. The combination with adjacent trucks and coupling devices thereon arranged to be released by changing the height of one truck relative to the other, of means for dropping one truck below the height of the other, substantially as described.

2. The combination with adjacent trucks and coupling devices thereon arranged to be released by changing the height of one truck relative to the other, of tracks to support the trucks provided with a portion inclining upward for a limited distance in the direction of movement of the trucks, substantially as described.

3. The combination with adjacent trucks and coupling devices thereon arranged to be released by changing the height of one truck relative to the other, of tracks for supporting the trucks provided with upward inclines in the direction of movement of the trucks and abrupt drops therefrom at the point where the couplings are to be released, substantially as described.

4. Means for coupling or uncoupling trucks especially within inaccessible rooms or passages, comprising an ordinary gripper-hook attached to one end of a truck, and a corresponding catch part consisting of a plain bar or strip of suitable material attached to the respective end of the following or the preceding truck respectively, in combination with an inclined stretch of track, said track being inclined in the direction of travel of the trucks, the parts coöperating so that upon one truck leaving the said incline at the high end, it becomes disconnected from the following truck still upon the incline, substantially as described.

In witness whereof I have hereunto set my hand, in the presence of two witnesses, at Zittau, Germany, May 17, 1901.

OTTO MIETASCHK. [L. S.]

Witnesses:
  WILLIAM H. HERZOG,
  CHEMNITZ H. SCHILLING.